United States Patent
Habedank

(10) Patent No.: US 6,604,793 B2
(45) Date of Patent: Aug. 12, 2003

(54) DEVICE FOR THE DETACHABLE ATTACHMENT OF AN OBJECT, IN PARTICULAR A CHILD'S SAFETY SEAT, ON A MOTOR VEHICLE SEAT

(75) Inventor: Klaus-Dieter Habedank, Stadthagen (DE)

(73) Assignee: Faurecia Autositze GmbH & Co. KG (DE)

(*) Notice: Subject to any disclaimer, the term of this patent is extended or adjusted under 35 U.S.C. 154(b) by 0 days.

(21) Appl. No.: 10/170,513

(22) Filed: Jun. 13, 2002

(65) Prior Publication Data

US 2003/0006641 A1 Jan. 9, 2003

(30) Foreign Application Priority Data

Jun. 13, 2001 (DE) .......................................... 101 28 670

(51) Int. Cl.[7] .............................................. A47B 97/00
(52) U.S. Cl. ................................................... 297/463.1
(58) Field of Search .............................. 297/463.1, 253, 297/216.1, 216.13, 452.18, 452.2

(56) References Cited

U.S. PATENT DOCUMENTS

| 5,941,601 A | * | 8/1999 | Scott et al. |
| 6,082,818 A | * | 7/2000 | Muller |
| 6,234,572 B1 | * | 5/2001 | Shiino et al. |
| 6,254,183 B1 | * | 7/2001 | Bian et al. |
| 6,264,274 B1 | * | 7/2001 | Frohnhaus et al. |
| 6,276,754 B1 | * | 8/2001 | Youssef-Agha et al. |
| 6,354,648 B1 | * | 3/2002 | Allan et al. |
| 6,416,129 B1 | * | 7/2002 | Hirota |

FOREIGN PATENT DOCUMENTS

| DE | 196 50 087 C 1 | 12/1997 |
| DE | 197 38 802 C 1 | 10/1998 |
| DE | 198 34 847 C 1 | 10/1999 |
| DE | 199 28 862 A 1 | 1/2001 |

* cited by examiner

Primary Examiner—Milton Nelson, Jr.
(74) Attorney, Agent, or Firm—Margaret Polson; Patent Law Offices of Rick Martin, P.C.

(57) ABSTRACT

The present structure relates to a device for the detachable attachment of an object, in particular a child's safety seat, on a motor vehicle seat. A seat-integrated holding device and an object-integrated holding device cooperate to attach the object to the seat. The seat-integrated holding device is rigidly connected with a pivot axle which extends between seat frame side parts. By rotating the pivot axle the seat-integrated holding device can be pivoted from a use position into a park position, and conversely. An operating element is disposed on the outside of the motor vehicle seat via which a torque can be transmitted onto the pivot axle. The structure addresses the problem of equipping a vehicle seat with a seat integrated holding device with significantly better operating comfort and ease.

10 Claims, 4 Drawing Sheets

DEVICE FOR THE DETACHABLE ATTACHMENT OF AN OBJECT, IN PARTICULAR A CHILD'S SAFETY SEAT, ON A MOTOR VEHICLE SEAT

CROSS REFERENCE APPLICATIONS

This application claims priority from application serial number 101 28 670.8 which was filed in Germany on Jun. 13, 2001.

FIELD OF INVENTION

The present invention relates to a device for the detachable attachment of an object, in particular a child's safety seat, on a motor vehicle seat.

BACKGROUND OF THE INVENTION

A well-known problem in the motor vehicle industry is the attachment of child safety seats to the existing seats of the motor vehicle. In order to securely attach the child safety seat, there must be a seat-integrated holding means, or anchor point, built into the frame of the seat. However, this seat-integrated holding means must not interfere with the comfort of the existing seat when in normal use.

A number of patents have been directed at this problem. A few of them are listed below.

DE 196 50 087 C1 describes an anchor point for child safety seats. Seat bearing brackets are provided in which the pivot axle is rotatably supported by bearing bushings. In order to be able to move the seat-integrated holding means, which are rigidly connected with the pivot axle, from the park position into the use position, and conversely, the backrest must first be folded forward. This opens up a relatively large gap between the seat cushion and the backrest through which the pivot movement of the holding means can take place. To execute this pivot movement, the seat-integrated holding means must either be pulled forward through the gap or must be grasped from behind and below and moved through the gap. Apart from the required folding of the backrest, this movement is cumbersome and time-consuming.

DE 197 38 802 C1, DE 198 34 847 C1 and DE 199 28 862 A1 also describe seat-integrated holding means of the type relevant here, which are rigidly incorporated into the support structure of a motor vehicle seat. This holding means comprises two holding brackets, with each holding bracket being pivotable about a vertical pivot axis from a park position into a use position, and conversely. The park and the use position are arrested with a latch. To convert the seat-integrated holding means into the use position, the latches are detached via a Bowden control unit such that the holding means can pivot by spring force into its use position.

The present invention addresses the problem of equipping a seat-integrated holding means with significantly better operating ease over the prior art.

SUMMARY OF THE INVENTION

The primary aspect of the present invention is to provide an anchor point, or seat-integrated holding means, which can easily be moved from its use position to the park position and vice-versa.

Other aspects of this invention will appear from the following description and appended claims, reference being made to the accompanying drawings forming a part of this specification wherein like reference characters designate corresponding parts in the several views.

According to the present invention an operating element (also called a handle) is provided on the outside of the vehicle seat. The actuation of the operating element transfers a torque to the pivot axle such that the seat-integrated holding means, rigidly connected with the pivot axle, can be moved from the park position into the use position, and vice-versa. The operating element is readily accessible on the outside of the vehicle seat such that, compared to the prior art, a significantly improved ease of operation is provided.

The torque transfer from the operating element onto the pivot axle can be realized in various ways. In a preferred embodiment of the present invention the operating element is a hand lever seated rotatably on the pivot axle. The lever comprises a laterally projecting catcher means, which is radially spaced from the rotational axis. The catcher means projects through a cutout of the adjacent seat frame side part and is operationally connected with a transmission lever rigidly connected with the pivot axle and projecting from it substantially radially. Thereby the torque is not directly transmitted via the hand lever onto the pivot axle, but rather indirectly via its catcher means and the transmission lever of the pivot axle. Further constructional options result for the advantageous implementations of the invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
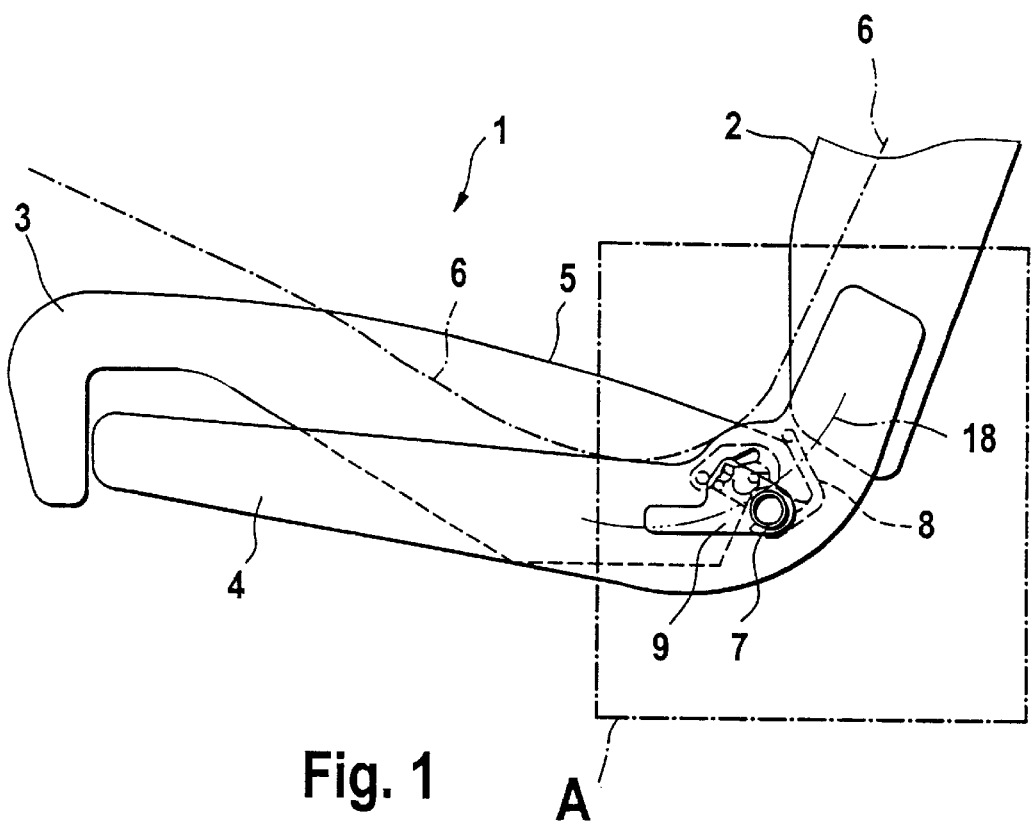
FIG. 1 is a schematic partial view of a motor vehicle seat with seat-integrated holding means for an object to be secured on the motor vehicle seat, with these holding means being in its arrested position of use.

As is known in the art, the motor vehicle seat shown in FIG. 1 comprises a seat part 1 and a backrest 2. Of the seat part 1 are shown a cushion 3 as well as a support structure in the form of frame side parts 4 provided on both sides. The frame side parts 4 are bent upwardly at their rearward ends, with this region serving for the securement of the back rest, which can also take place via a (not shown) rest inclination adjustment axle. A line 5 drawn in FIG. 1 documents the nonloaded seat cushion 3, while a line 6 shows the seating region of a seat occupant seated on the motor vehicle seat. The following descriptions are based on FIGS. 2 to 4, since in these Figures, due to the larger scale, details are more clearly evident or the movement sequences are evident.

Between the two frame side parts 4 of the support structure of seat part 1 in its rearward region extends a transverse tube 7, which is rotatably supported in the frame side parts 4. Rigidly connected with the transverse tube 7 are two holding means spaced apart, which are developed as so-called isofix brackets 8. The isofix brackets 8 have an attachment point 8.1 for the attachment of the child safety seat or other device. The isofix brackets are shown in the use position in FIGS. 2 and 3 and in the park position in FIG. 4.

Isofix brackets 8 are part of prior art and therefore do not need to be described further here. The isofix brackets 8 form the seat-integrated holding means of the present invention. The isofix bracket 8 is rigidly connected with the support structure of the motor vehicle seat via the transverse tube 7. The holding means of an object, in particular of a child's safety seat, removably attaches to attachment points 8.1 when the isofix brackets are in their use position to secure the object on to the motor vehicle seat. Therefore, the object is connected via a rigid connection with the support structure of the motor vehicle seat. This attachment is also known from prior art such that further explanations are superfluous.

On one side of the seat part 1 a hand lever 9 is rotatably supported on the transverse tube 7. The hand lever 9 is attached such that is cannot be pulled axially from the transverse tube 7 (not shown). This hand lever 9 comprises a grip portion 9.1 as well as an abutting portion 9.2 implemented integrally with it and, which is, when viewed from the transverse tube 7, radially shorter. From the abutting portion 9.2 two bolts 10 and 11 project inwardly through a slotted hole 12 in the frame side part 4. The slotted hole 12 is located on a radius about the transverse tube 7, such that the bolts 10 and 11 can move free of constraint when viewed radially in the oblong hole 12 when the hand lever 9 is pivoted.

The two bolts 10 and 11 receive between them the end 13.1 of a transmission lever 13 rigidly connected with the transverse tube 7. In the locked use position of the isofix bracket 8, shown in FIG. 2, a spacing exists between the bolt 10 and the end 13.1 of the transmission lever 13. The other bolt 11 in this configuration is in contact with detent 14. Detent 14 is rotatably attached via a pivot axle 15 to frame side part and is pre-stressed in the arrest position through spring means (not shown). When detent 14 is in this locking position for the use position, the front end 14.1 of this detent 14 engages an arrest cam 16 of transmission lever 13, which is rigidly connected with the transverse tube 7, thereby holding the isofix brackets 8 in the use position. In this locking position the arrest cam 16 rests against a stop 17, which is rigidly connected with the frame side part 4, such that the isofix brackets 8 cannot be further pivoted in the counterclockwise direction.

Figure 2:
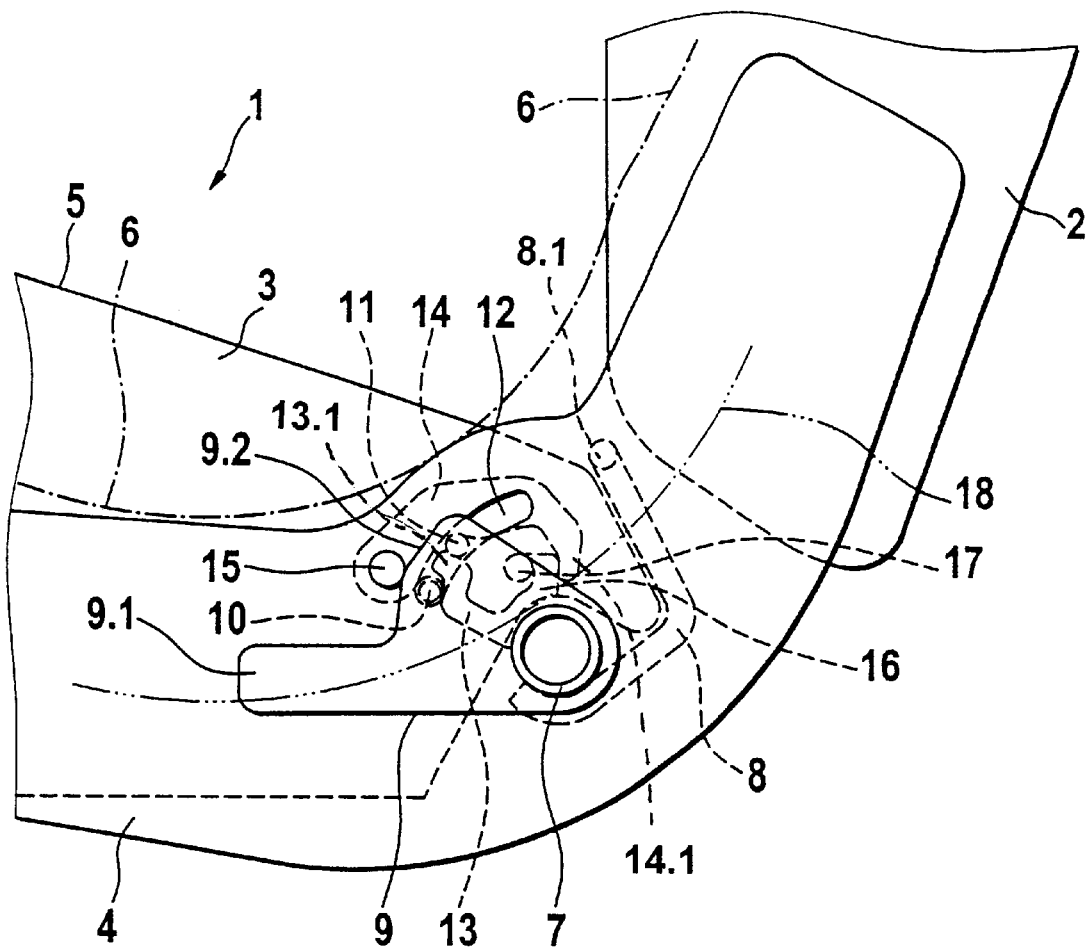
FIG. 2 is a detail A according to FIG. 1 on an enlarged scale.

In FIG. 2 is evident that the isofix brackets 8 in the position of use project beyond line 18, which extends spaced apart from and parallel to the seating line 6. This line 18 delimits the comfort zone, into which hard objects must not project, since this would impair the seating comfort of a seat occupant. Thus, if a seat occupant is to sit comfortably on the motor vehicle seat, it is required that the isofix brackets 8 are pivoted out of the use position (FIG. 2) into the park position (FIG. 4), in which they are disposed behind line 18.

In the following the sequence of movements is described which occurs when pivoting the isofix brackets 8 from the use position into the park position and vice-versa. Starting point of these explanations is the state depicted in FIG. 2.

Figure 3:
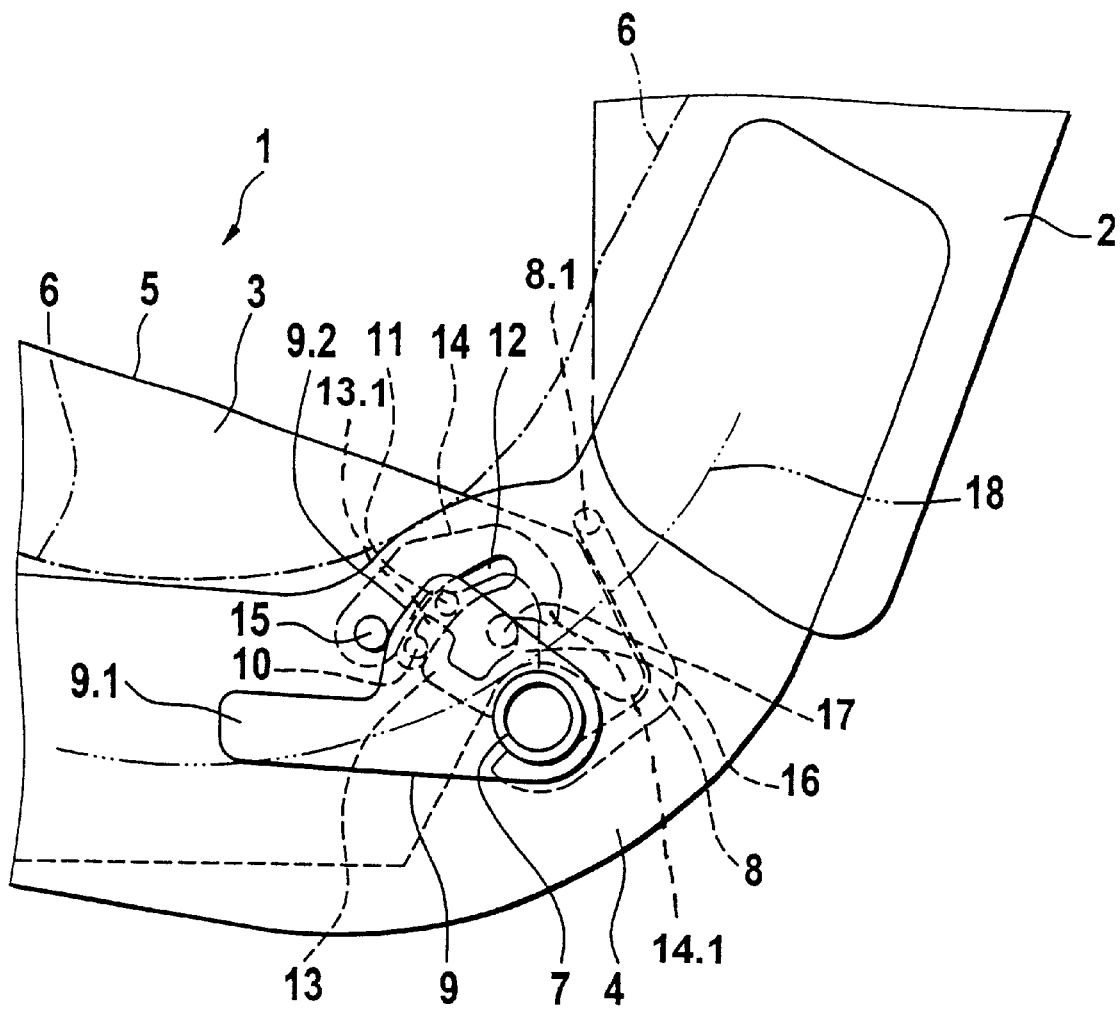
FIG. 3 is a representation according to FIG. 2, which shows the unlatched position of use of the seat-integrated holding means.
Figure 4:
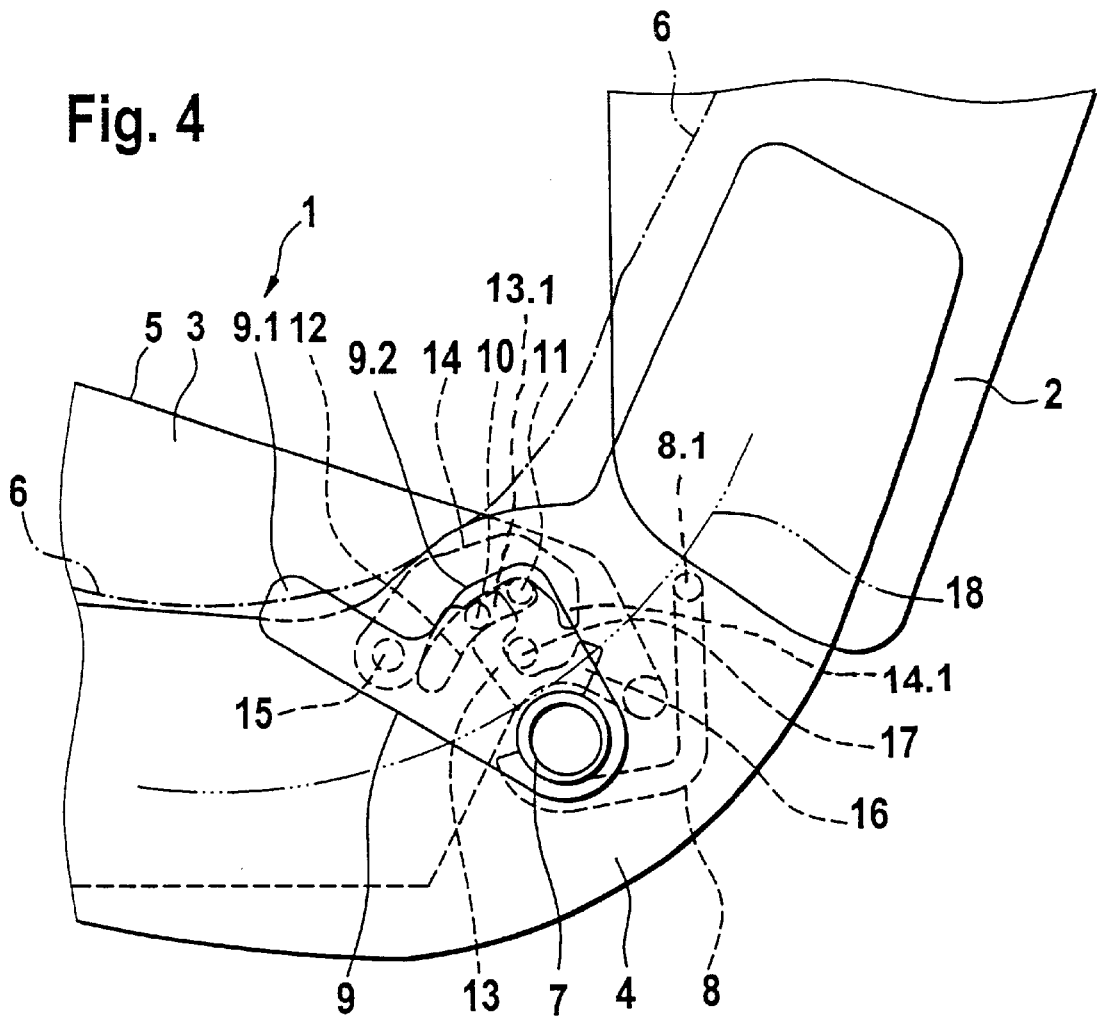
FIG. 4 is a representation according to FIGS. 2 and 3 with the seat-integrated holding means being in the park position.

By the pivoting of hand lever 9 in the clockwise direction, as shown by arrow A, the detent 14 is pressed upon by the bolt 11 such that the front end 14.1 of the detent 14 is freed from the arrest cam 16 of transmission lever 13. This situation is depicted in FIG. 3. This representation shows clearly that the bolt 10 has already come into contact on the transmission lever 13 such that with further pivoting of the hand lever 9 the transverse tube 7, and with it the isofix brackets 8, are rotated in the clockwise direction. This pivot movement is limited by stop 17, which the transmission lever 13 comes into contact on it. In this situation the park position of the isofix brackets 8 shown in FIG. 4 is obtained. During the pivot movement of the hand lever 9 the bolt 11 remains continuously in contact on detent 14 such that it is held in the open position.

To move the isofix brackets 8 from the park position into the use position the hand lever 9 is pivoted in the counterclockwise direction. First, a small dead stroke is executed until bolt 11 stops in contact on the end of the transmission lever 13. Now the transmission lever 13, the transverse tube 7 and the isofix brackets 8 are carried along until the use position, depicted in FIG. 2, has been reached which is delimited by stop 17. In this situation the detent 14 automatically extends again over the arrest cam 16 such that the use position is locked.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A safety anchor for a vehicle seat, said safety anchor comprising:
    a frame side part on either side of a vehicle seat;
        said vehicle seat having a backrest attached to the frame side parts;
    a transverse tube rotatably supported in the frame side parts;
    a bracket extending from the transverse tube generally between the vehicle seat and the backrest;
    said bracket having a use position when the transverse tube is rotated forward relative to a top portion thereof and the vehicle seat, and having a park position when the transverse tube is rotated backward relative to the top portion thereof and the vehicle seat;
    a hand lever positioned outbound of either frame side part and connected via an assembly to the transverse tube; and
    wherein moving the hand lever moves the bracket from the use position to the park position where a user can comfortably sit in the vehicle seat.

2. The safety anchor of claim 1, further comprising a slotted hole in the frame side part in which slides a catch connected to the hand lever, said catch positioned in movable contact with a transmission lever that is secured to the transverse tube; and
    wherein moving the hand lever moves the catch and urges the transmission lever which rotates the transverse tube.

3. The safety anchor of claim 2, wherein the catch further comprises a pair of bolts which sandwich the transmission lever.

4. The safety anchor of claim 2, further comprising a detent having a pivot axle, said detent engaging an arrest cam of the transmission lever via a spring, so as to lock the bracket in the use position.

5. The safety anchor of claim 1, wherein the bracket further comprises an isofix bracket with an attachment point.

6. An anchor for detachably securing an object to a motor vehicle seat, said anchor comprising:
    a seat-integrated holding means and an object-integrated holding means cooperatively attached together;

the seat-integrated holding means is a pivot axle extending between seat frame side parts;

wherein through a rotation of the pivot axle the seat integrated holding means can be pivoted from a position of use into a position of park, and conversely;

characterized in that on the outside of the seat frame side parts an operating element is disposed via which a torque can be transmitted onto the pivot axle;

the operating element being a hand lever seated rotatably on the pivot axle, which hand lever comprises a catcher means which project through a cutout of an adjacent seat frame side part which cooperates with a transmission lever rigidly connected with the Divot axle and projecting from it substantially radially to transmit the torque: and the catcher means are comprised of two bolts spaced apart from one another, which receive between them the free end of the transmission lever, wherein one of the bolts carries along the transmission lever into the park position and the other bolt the transmission lever into the use position.

7. The anchor as claimed in claim 6, characterized in that a detent is provided which is rotatably supported on the seat frame side part, and in the position of use extends behind an arrest cam rigidly connected with the pivot axle.

8. The anchor as claimed in claim 7, characterized in that the bolt carrying along the transmission lever into the position of use, during the pivoting of the hand lever into the park position presses upon the detent such that it is freed from the arrest cam before the other bolt comes into contact on the transmission lever and carries the latter along into the park position.

9. The anchor as claimed in claim 7, characterized in that between the arrest cam and the transmission lever a stop is provided, which limits the pivot range of the arrest cam to the position of use and the pivot range of the transmission lever to the position of park.

10. The anchor as claimed in claim 7, characterized in that the detent is pre-stressed into its arrest position.

* * * * *